United States Patent
Kwon et al.

(10) Patent No.: US 9,249,481 B2
(45) Date of Patent: Feb. 2, 2016

(54) PREPARATION METHOD OF SILVER NANO-STRUCTURE FOR SURFACE ENHANCED, RAMAN SCATTERING SUBSTRATE AND SILVER NANO-STRUCTURE THEREBY

(71) Applicant: KANGWON NATIONAL UNIVERSITY-INDUSTRY COOPERATION FOUNDATION, Chuncheon-si, Gangwon-do (KR)

(72) Inventors: Chan Ho Kwon, Chuncheon-si (KR); So Young Eom, Chuncheon-si (KR); Hong Lae Kim, Namyangju-si (KR)

(73) Assignee: Kangwon National University-Industry Cooperation Foundation, Chuncheon-si, Gangwon-do (KR)

( * ) Notice: Subject to any disclaimer, the term of this patent is extended or adjusted under 35 U.S.C. 154(b) by 227 days.

(21) Appl. No.: 14/043,074

(22) Filed: Oct. 1, 2013

(65) Prior Publication Data
US 2014/0099513 A1    Apr. 10, 2014

(30) Foreign Application Priority Data
Aug. 27, 2012    (KR) .................. 10-2012-0093815

(51) Int. Cl.
| | |
|---|---|
| B22F 9/24 | (2006.01) |
| B82Y 40/00 | (2011.01) |
| C22C 5/06 | (2006.01) |
| C22B 3/00 | (2006.01) |

(52) U.S. Cl.
CPC ... C22C 5/06 (2013.01); B22F 9/24 (2013.01); C22B 11/04 (2013.01); B22F 2301/255 (2013.01); B22F 2304/054 (2013.01); B82Y 40/00 (2013.01); Y10S 977/895 (2013.01); Y10S 977/954 (2013.01); Y10T 428/12014 (2015.01)

(58) Field of Classification Search
None
See application file for complete search history.

(56) References Cited

U.S. PATENT DOCUMENTS

| | | | | |
|---|---|---|---|---|
| 6,875,465 B2* | 4/2005 | Bishop | ............... | B82Y 30/00 427/180 |
| 8,062,698 B2* | 11/2011 | Chopra | ............... | C09D 11/322 340/1.1 |
| 2013/0027706 A1* | 1/2013 | Dasgupta | ............. | G01N 21/554 356/402 |

OTHER PUBLICATIONS

Ying Fang et al; Measurement of the Distribution of Site Enhancements in Surface-Enhanced Raman Scattering; Science vol. 321; Jul. 18, 2008.

* cited by examiner

*Primary Examiner* — George Wyszomierski
(74) *Attorney, Agent, or Firm* — Lucas & Mercanti, LLP (57) ABSTRACT

A preparation method of silver nanostructure for use as substrate of surface-enhanced Raman scattering (SERS), which can ensure the 'hot spot', which provides the considerably very intense electromagnetic field in which the silver nanostructures have uniform average size and very strong forms of particles, by characterizing a variety of conditions such as, for example, concentration of $AgNO_3$ and reductant, reaction temperature, stirring velocity, single dropwise addition quantity, dropwise addition rate, or total dropwise addition quantity, which were unpredictable in the conventional silver nanoparticle preparation method using $AgNO_3$ aqueous solution and $NaBH_4$ reductant, so that the preparation method can be advantageously applied for the mass production of silver nano-structures for use as substrate of SERS because the method can provide multimer form with enhanced SERS signals and reproducibility, and also ability to selectively control the particle size.

9 Claims, 9 Drawing Sheets

PREPARATION METHOD OF SILVER NANO-STRUCTURE FOR SURFACE ENHANCED, RAMAN SCATTERING SUBSTRATE AND SILVER NANO-STRUCTURE THEREBY

CROSS-REFERENCE TO RELATED APPLICATIONS

This application claims the benefit of Korean Patent Application No. 10-2012-0093815, filed on Aug. 27, 2012, the contents of which are incorporated herein by reference.

BACKGROUND

1. Field of the Invention

The present invention relates to a silver nano-structure for surface enhanced Raman scattering (SERS) substrate and silver nano-structure thereby.

2. Description of the Related Art

High sensitivity detection of biological sample or other samples to the level of single molecule detection can be widely utilized in a variety of areas including diagnostics, pathology, toxicology, environmental sampling, or chemical analysis. For this purpose, nano-particles and chemicals labeled with specific substances have been widely used in researches on metabolism, distribution and binding of small amount of synthetic materials and biomolecules. For example, radioisotopes, organic fluorescent dyes or inorganic quantum dots have been widely used.

The method using radioisotopes generally uses $^3H$, $^{14}C$, $^{32}P$, $^{35}S$, or $^{125}I$ which are radioactive isotopes of $^1H$, $^{12}C$, $^{31}P$, $^{32}S$, or $^{127}I$. The radioisotopes have almost identical chemical properties as non-radioactive isotopes and thus are arbitrarily substitutable, and their relatively large emission energy enables even a small amount detection. For the above advantages, the radioisotopes have been used for a long period of time. However, using radioisotopes also has shortcomings. That is, it is not easy to conduct the process because of harmful radiation, and it is not convenient to store or conduct experiment with certain isotopes despite large emission energies, particularly those with short half-lives.

One of the representative replacements for the radioisotopes is the organic fluorescent dyes. The organic fluorescent dyes emit light with unique wavelength, as these are excited by the light at certain wavelengths. As the detection methods pursue minimization, radioactive materials showed limited sensitivity, taking long time until detection result is obtained. Compared to this, fluorescent dyes can emit several thousands of photons per molecule when placed under proper conditions, and in theory, it can detect even a single molecule level.

However, using fluorescent dyes also has shortcomings. That is, unlike radioisotopes, it is not possible to directly substitute the atoms of the active ligand, and it is required to connect the fluorescent dyes by distorting certain portions that have relatively less influence on activity based on structure-activity relationship. The fluorescent dyes suffer photobleaching as time passes, and very narrow light wavelength of activation and very wide wavelength of the light emission cause interferences between different fluorescent dyes. Furthermore, the number of available fluorescent dyes is limited.

The quantum dots, which are semiconductor nano materials, are composed of CdSe, CdS, ZnS, ZnSe and emit different colored lights depending on sizes and types. Compared to organic fluorescent dyes, the quantum dots have broader activity wavelengths, while these represent narrow light emission wavelength. Accordingly, there are more quantum dots than organic fluorescent dyes that emit different colors. For the above reasons, quantum dots are more generally used recently, as a method for overcoming drawbacks of the organic fluorescent dyes. However, the quantum dots also have shortcomings such as high toxicity and other constraints that prevent mass production. While there are a variety of quantum dots theoretically, in actual use, the number of quantum dots that can be used is quite limited.

The Raman spectroscopy and/or labeled substances for surface plasmon resonance have thus been suggested to resolve the problems mentioned above.

The surface enhanced Raman scattering (SERS) is the spectroscopic method that utilizes abrupt surge of Raman scattering intensity by more than $10^6 \sim 10^8$ times higher, where the molecules are adsorbed on roughened surfaces of metal nano-structures such as gold or silver. When the light passes a concrete medium, a certain amount of different types of lights are generated other than the original wavelength of the light, which is the Raman scattering. Some of the scattered lights have varied frequencies from the originally excited light as the vibrating state of the molecules are excited to higher energy level, and the Raman scattering spectrum wavelengths represent chemical composition and structural properties of the light-absorbing molecules in the sample. Accordingly, Raman spectroscopy, in combination with the fast-advancing nano technology, is anticipated to be the future technology that can directly measure single molecules with high sensitivity, and also as the essential tool for medical sensing. The SERS effect is associated with Plasmon resonance phenomenon, in which metal nanoparticles show clear optical resonance in response to incident electromagnetic radiation due to collective coupling among the conductive electrons within the metal. Basically, the nanoparticles of gold, silver, copper and certain other metals can act as a small antenna to enhance centralization of the electromagnetic radiations. Molecules located adjacent to such particles show considerably higher sensitivity than ordinary Raman scattering.

Therefore, researches have actively conducted to perform early diagnosis of genes or proteins (i.e., biomarkers) associated with a variety of disease, using SERS sensors. The Raman spectroscopy provides several advantages that other analysis methods (including infrared spectroscopy) cannot. Compared to infrared spectroscopy which can obtain strong signal only from the molecule with dipole moment, Raman spectroscopy can obtain strong signals even from non-polar molecules which have variations in induced polarizability, which means all the organic molecules have their own Raman shifts ($cm^{-1}$). In addition, Raman spectroscopy is free from the interference by water molecules, and thus is more suitable for the detection of biomolecules such as proteins or genes. However, the relatively low signal strength hinders the practical use of the Raman spectroscopy despite the long period of researches.

Following the discovery of SERS, researches continued. After the report about SERS which is capable of signal detection in a single molecular level in chaotic aggregates of nano-particles to which fluorescent molecules are adsorbed (Science 1997, 275(5303), 1102; Phys. Rev. Lett. 1997, 78(9), 1667), researchers reported about SERS potentiation using a variety of nano-structures (nanoparticles, nanoshells, nanowires). To utilize the high sensitivity SERS phenomenon in the development of biosensors, Mirkin Research Group (Northwestern Univ.) has recently successfully conducted high sensitivity DNA analysis using DNA-gold nanoparticles, with the detection limit of such format reaching 20 fM (Science, 2002, 297, 1536). However, none has shown any progress since the initial research about method for preparing single molecule SERS substrate based on salt induced aggregation of silver (Ag) nanoparticles with Raman-active molecules (e.g., Rhodamine 6G). Report said that only fraction (below 1%) of the colloids with heterogeneous aggregation has single molecular SERS activity (J. Phys. Chem. B 2002, 106(2), 311). Although the random heterogeneous (i.e., roughened) surfaces provide a great amount of interesting and essential data associated with the SERS, such strategy is basically not reproducible, because the enhancement is subject to considerable change even by a small change on surface morphology. Recently, Fang et al. reported about quantitative measurement on distribution of enhancement in SERS. While the most concentrated parts (EF>$10^9$) were 64 out of total 1,000,000, such only contributed to 24% of the total SERS intensity (Science, 2008, 321, 388). If any structure that can maximize SERS signal is ensured, very useful, high-sensitivity, and high-reliability biomolecule analysis will be made available. This will be also very useful for imaging technology both in vitro and in vivo.

Most SERS detections or, various analytes used colloidal metal particles coated on substrate and/or supports such as aggregated silver nanoparticles. However, while such arrangement enables SERS detection with sometimes $10^6$ to $10^8$ times greater sensitivity, this cannot detect single molecule of the small analyte such as nucleotide. Despite the advantages of SERS, the SERS phenomenon has incompletely elucidated mechanism, and attempts to develop and commercialize nano-biosensors and to apply the SERS phenomenon are still faced with many challenges that have to be tackled with, such as lack of accurate, structurally-defined nanoparticle synthesis and control, and difficulty in reproducibility and reliability due to variation of enhancement efficiency depending on wavelength of the light for use in spectrum measurement, or direction of polarization. Therefore, to resolve the problems explained above, accurate understanding of optical properties of well-defined nano-structures and accurate control on SERS phenomenon at the same time is necessary.

L. Brus et al. (JACS. 2002) reported that SERS signal was enhanced in the metal particle dimmers, when very strong electromagnetic field (hot spot or interstitial field) was formed between two or more nanoparticles, and according to electromagnetic theory calculation, approximately $10^{12}$ SERS enhancement is expected from the hot spot. The enhanced sensitivity of Raman detection varies depending on presence or absence of the hot spot, although it is not clearly regular in the colloid particle aggregation. However, none has suggested about the relationship between the physical structure of the hot spot, distance range from the nanoparticles with enhanced sensitivity, and spatial relationship between the analyte to enhance the sensitivity and nanoparticle aggregations. Furthermore, the nanoparticle aggregation is basically unstable in solution, and gives adverse effect on the reproducibility of the single molecular analyte detection.

By amplifying the optical signal, the electromagnetic signals at the external junctions on two or more nano-structures are amplified, thus enabling detection of unique amplified signals (e.g., Raman, fluorescence, scattering) of the molecules at the gap emitting optical signals. However, to obtain SERS signals using such structures, issues like signal quantification, reproducibility of the result, convenience and simplicity of synthesis, cost or stability of probe still remain as the problems to be tackled with.

From the microscopic prospect, the fact that different physical properties appear depending on sizes and shapes of particles can mean hindrance to infinite utilization in the application fields like catalysts, nano devices, nano sensors or medicines. Accordingly, researches focus on inventing nanostructures that are accurately defined structurally. Currently, many preparation methods are available for preparing nanoparticle colloid with regular size distribution and high dispersive powder in 10-100 nm range.

However, it is still necessary to invent SERS substrate with high-sensitivity SERS activity and reproducibility, from the prospect of principles of spectroscopic structure analysis or detection with SERS on molecules adsorbed to metal surfaces. The principle that explains SERS effect is generally categorized into mainly, electromagnetic theory and charge transfer theory. The electromagnetic theory car, be explained with local field enhancement. That is, upon exposure to light that meets plasmon resonance conditions of gold, or silver nanoparticles, the electromagnetic field of electromagnetic radiation is amplified near the surface of the metal nanoparticle. The adsorbed molecules have amplification of Raman scattering due to enhanced electromagnetic radiation. On the other hand, the charge transfer theory is based on chemical enhancement, according to which the metal-molecule complex in charge transferable state theoretically act as resonant condition which mediates resonant Raman scattering. The intensity of SERS mainly relies on the resonance structure of surface plasmon, which is determined according to metal nano-structures. Accordingly, it is necessary to design nanostructures that can increase SERS cross sectional area and to enhance reproducibility.

The SERS phenomenon is comprehensively understood in its mechanism or aspect of spectroscopic structure analysis on adsorbate. The general SERS spectrum for measurement characteristically represents molecules adsorbed on the metal surface. Accordingly, SERS is done mainly to determine orientation of the molecules adsorbed to the nano-structures or vibrational structure thereof, based on the analysis on size of enhancement or vibrational mode (peak intensities and locations) rather than analysis on peak profiles by metal nanoparticles. Generally, gold nanoparticles provide larger SERS cross section area than silver nanoparticles, and better reproducibility. However, due to less competitive price of the gold nanoparticles, demands increases for silver nano-structures with high sensitivity SERS activity and reproducibility. Accordingly, silver nanoparticle colloids are considered to be a good candidate for SERS substrate development. A silver nano-structure preparation method is thus necessary, which can provide silver nano-structures with high sensitivity SERS activity in both adsorbate spectroscopic structural analysis and principle of detection and reproducibility, and which can provide silver nano-structures with hot spots having large SERS cross section areas based on the same.

The present inventors discovered that, in the conventional silver nanoparticle preparation method using $AgNO_3$ aqueous solution and $NaBH_4$ reductant, by characterizing a variety of unpredictable conditions such as, concentration of $AgNO_3$ and reductant, reaction temperature, stirring velocity, single dropwise addition quantity, dropwise addition rate, or total dropwise addition quantity, it is possible to ensure the 'hot spot', the considerably very intense electromagnetic field in which two to four particles are agglomerated in the prepared silver nano-structures in such a form to enhance SERS signals, and also to provide uniform-sized silver nano-structures and provide reproducibility of the silver nano-structures, and therefore, completed the present invention based on such finding.

SUMMARY OF THE INVENTION

A technical object of the present invention is to provide a preparation method of silver nano-structures for use as substrate of surface-enhanced Raman scattering (SERS) at 0-5° C. or room temperature.

Another technical object of the present invention is to provide silver nano-structures prepared by the above-mentioned preparation method at 0-5° C. or room temperature.

Yet another technical object of the present invention is to provide silver nano-structures prepared by the above-mentioned preparation method at room temperature.

To achieve the objects of the present invention, in one embodiment, a preparation method of silver nano-structures for use as substrate of surface-enhanced Raman scattering (SERS) is provided, including steps of:

cooling $NaBH_4$ down to 0-5° C. (step 1);

preparing reductant solution by placing $NaBH_4$ cooled at step 1 in a flask maintained at 0-5° C. or room temperature, and stirring the same (step 2);

obtaining reaction solution by dropwise-adding room-temperature $AgNO_3$ to the reductant solution prepared at step 2 until end point (step 3); and ending the reaction by adding $NaBH_4$ prepared at step 1 into the reaction solution obtained at step 1.

The present invention also provides silver nano-structures prepared by the above-mentioned preparation method at 0-5° C. or room temperature.

The present invention also provides silver nano-structures prepared by the above-mentioned preparation method at room temperature.

Since the preparation method of silver nano-structures for use as substrate of surface-enhanced Raman scattering (SERS) according to the present invention ensures that the 'hot spot' is provided, which is the considerably very intense electromagnetic field in which the silver nano-structures have uniform average size and very strong forms of particles, by characterizing a variety of conditions such as, for example, concentration of $AgNO_3$ and reductant, reaction temperature, stirring velocity, single dropwise addition quantity, dropwise addition rate, or total dropwise addition quantity, which were unpredictable in the conventional silver nanoparticle preparation method using $AgNO_3$ aqueous solution and $NaBH_4$ reductant, the preparation method can be advantageously applied for the mass production of silver nano-structures for use as substrate of SERS because the method can provide multimer form with enhanced SERS signals and reproducibility, and also ability to selectively control the particle size.

BRIEF DESCRIPTION OF THE DRAWINGS

The foregoing and/or other aspects according to an embodiment will be more apparent upon reading the description of certain exemplary embodiments with reference to the accompanying drawings, in which.

DETAILED DESCRIPTION OF EXEMPLARY EMBODIMENTS

The present invention will be explained below with reference to embodiments and drawings.

In one embodiment, a preparation method of silver nano-structures for use as substrate of surface-enhanced Raman scattering (SERS), is provided, including steps of:

cooling $NaBH_4$ down to 0-5° C. (step 1);

preparing reductant solution by placing $NaBH_4$ cooled at step 1 in a flask maintained at 0-5° C. or room temperature, and stirring the same (step 2);

obtaining reaction solution by dropwise-adding room-temperature $AgNO_3$ to the reductant solution prepared at step 2 until end point (step 3); and ending the reaction by adding $NaBH_4$ prepared at step 1 into the reaction solution obtained at step 1.

To be specific, the present invention may be performed at two reaction temperatures (0-5° C. or room temperature) by preparation methods 1 and 2 below.

PREPARATION METHOD 1

Reaction Temperature of 0-5° C.

Further, the preparation invention provides a preparation method of silver nano-structures for use as substrate of surface-enhanced Raman scattering (SERS), including steps of:

cooling $NaBH_4$ at concentration between $1.0 \times 10^{-3}$ M and $3.0 \times 10^{-3}$ M down to 0-5° C. (step 1);

preparing reductant solution by placing $NaBH_4$ cooled to 0-5° C. at step in flask maintained at 0-5° C., and stirring at 1000-2000 rpm (step 2);

obtaining reaction solution by dropwise adding room-temperature $AgNO_3$ at concentration between $7.0 \times 10^{-3}$ M and $9.0 \times 10^{-3}$ M to the reductant solution of step 2 to end point, according to conditions including 40-210 μl of single dropwise addition, 3-105 μl/s of dropwise rate, and 6/100-23/100 volume ratio for total dropwise addition quantity (step 3); and ending the reaction by adding $NaBH_4$ prepared at step 1 to the reaction solution obtained at step 3, at a volume ratio of 1/40-1/20 (step 4), in which the volume ratios of steps 3 and 4 are determined with reference to the volume of the reductant solution prepared at step 2 as 1.

The preparation method according to the present invention will be explained below step by step.

According to the preparation method of the present invention, step 1 involves cooling $NaBH_4$, which is the reductant, down to 0-5° C., preferably to 0-2° C., or most preferably to 0° C. The $NaBH_4$ concentration may range between $1.0 \times 10^{-3}$ M and $3.0 \times 10^{-3}$ M, or preferably, between $1.5 \times 10^{-3}$ M and $2.5 \times 10^{-1}$ M, or most preferably, be $2.0 \times 10^{-3}$ M. When $NaBH_4$ concentration is less than $1.0 \times 10^{-3}$ M, volume has to be increased to meet the ends with the $AgNO_3$ solution for titration, which means formation of small-sized silver nano-structures and reduced activity. The concentration exceeding $3.0 \times 10^{-3}$ M will cause aggregation of silver nano-structures to reach the level of precipitation.

With the preparation method according to the present invention, step 2 involves preparing reductant solution by introducing $NaBH_4$ prepared at step 1 into a flask maintained at 0-5° C. (preferably, 0-2° C., or most preferably, 0° C.) and stirring the same. The stirring may be performed at 1000-2000 rpm, preferably, 1400-1600 rpm, or most preferably, 1500 rpm. When the stirring is done at a velocity less than 1000 rpm, $AgNO_3$ concentration becomes too low, while, when the velocity exceeds 2000 rpm, there will be technical constraint and the cost to overcome such constraint outweighs the value.

According to the preparation method of the present invention, step 3 involves obtaining reaction solution by dropwise adding room-temperature $AgNO_3$ to the reductant solution of step 2 until end point.

The $AgNO_3$ concentration may be between $7.0 \times 10^{-3}$ M and $9.0 \times 10^{-3}$ M, or preferably, $7.5 \times 10^{-3}$ M and $8.5 \times 10^{-3}$ M, or most preferably, $8.0 \times 10^{-3}$ M. When the $AgNO_3$ concentration is less than $7.0 \times 10^{-3}$ M, the dropwise addition rate has to be increased to the limit of dropwise (division) velocity to increase activity, while the concentration exceeding $9.0 \times 10^{-3}$ M means technical difficulty of having to increase stirring velocity to prevent readiness to precipitate.

The single dropwise addition quantity of $AgNO_3$ may be 40-210 µl, or preferably, 45-55 µl, or most preferably, 50 µl. With the $AgNO_3$ single dropwise addition quantity less than 40 µl, it is difficult to increase the dropwise addition rate to above 50 µl/s to prepare the silver nano-structures with proper activity. With the single dropwise addition quantity exceeding 210 µl, there is the technical difficulty of having to further increasing the stirring velocity to prevent readiness to precipitate.

The $AgNO_3$ dropwise addition rate may be 3-105 µl/s, or preferably, 15-20 µl/s, or most preferably, 16.7 µl/s. With the dropwise addition rate less than 3 µl/s, silver nano-structures of small size are formed and thus activity is reduced. With the dropwise addition rate exceeding 105 µl/s, there is the problem of silver nano-structures agglomeration to the extent of precipitation.

The total $AgNO_3$ dropwise addition quantity may be, with respect to the volume of the reductant solution prepared at step 2, 6/100-23/100 volume ratio, or preferably, 7/100-11/50 volume ratio. With the total dropwise addition quantity less than 6/100 volume ratio, the remnant of the reductant hinders arriving at the end point, while the total dropwise addition quantity exceeding 23/100 volume ratio has the problem of silver nano-structure continuously agglomerating to the extent of precipitation.

According to the preparation method of the present invention, step 4 involves ending the reaction by adding a small amount of $NaBH_4$ used at step 1. The volume ratio of $NaBH_4$ added to end the reaction may be 1/40-1/20 volume ratio with respect to the volume ('1') of $NaBH_4$ used at step 1, but not limited thereto.

PREPARATION METHOD 2

Room-temperature Reaction

In one embodiment, a preparation method of silver nano-structure for use as substrate of surface-enhanced Raman scattering (SERS), including steps of:

cooling NaBH at concentration between $1.0 \times 10^{-3}$ M and $3.0 \times 10^{-3}$ M down to 0-5° C. (step 1);

preparing reductant solution by introducing $NaBH_4$ cooled to 0-5° C. at step 1 into a flask maintained at room temperature and stirring at a velocity of 1000-2000 rpm (step 2);

obtaining reaction solution by dropwise adding room-temperature $AgNO_3$ at concentration between $7.0 \times 10^{-3}$ M and $9.0 \times 10^{-3}$ M according to condition including 40-210 µl of single dropwise addition quantity, 3-155 µl/s of dropwise addition rate and 6/100-23/100 volume ratio of total dropwise addition quantity, to the reductant solution of step 2 (step 3); and ending the reaction by adding $NaBH_4$ prepared at step 1 by a volume ratio of 1/40-1/20, to the reaction solution obtained at step 3 (step 4), in which the volume ratios at steps 3 and 4 are determined with reference to the volume of the reductant solution prepared at step 2 as 1.

The preparation method according to the present invention will be explained in detail below step by step.

According to the preparation method of the present invention, step 1 involves cooling the $NaBH_4$, i.e., the reductant down to 0-5° C., or preferably, to 0-2° C., or most preferably, to 0° C. The $NaBH_4$ concentration may range between $1.0 \times 10^{-3}$ M and $3.0 \times 10^{-3}$ M, or preferably, between $1.5 \times 10^{-3}$ M and $2.5 \times 10^{-3}$ M, or most preferably, be $2.0 \times 10^{-3}$ M. With the $NaBH_4$ concentration less than $1.0 \times 10^{-3}$ M, the volume has to be increased to meet the ends with the $AgNO_3$ solution for titration, which means that small-sized silver nano-structures are formed and activity is decreased. With the concentration exceeding $3.0 \times 10^{-3}$ M, the silver nano-structures agglomerate with each other to the extent of precipitation.

According to the preparation method of the present invention, step 2 involves preparing reductant solution by introducing $NaBH_4$ prepared at step 1 into a flask exposed to room-temperature environment, and stirring the same. The stirring may be done at a velocity of 1000-2000 rpm, or preferably, 1400-1600 rpm, or most preferably, 1500 rpm. With the stirring velocity less than 1000 rpm, the $AgNO_3$ concentration becomes too low, while the stirring exceeding 2000 rpm means that technical limit has to be overcome for which cost outweighs the value for doing so.

According to the preparation method of the present invention, step 3 involves obtaining reaction solution by dropwise adding the room-temperature $AgNO_3$ to the reductant solution of step 2 until the end point.

The $AgNO_3$ concentration may range between $7.0 \times 10^{-3}$ M and $9.0 \times 10^{-3}$ M, or preferably, between $7.5 \times 10^{-3}$ M and $8.5 \times 10^{-3}$ M, or most preferably, may be $8.0 \times 10^{-3}$ M. With the $AgNO_3$ concentration less than $7.0 \times 10^{-3}$ M, it is necessary to increase the dropwise addition rate to ensure that the activity is increased, but this means that the limit of dropwise addition (division) rate has to be lifted off. With the concentration exceeding $9.0 \times 10^{-3}$ M, there is a technical difficulty of having to further increasing the stirring velocity to prevent readiness to precipitate.

The single dropwise addition quantity of $AgNO_3$ may range between 40-210 μl, or preferably, between 45-55 μl, or most preferably, may be 50 μl. When the single dropwise addition quantity of $AgNO_3$ is less than 40 μl, it is necessary to increase the dropwise addition rate to above 50 μl/s to ensure that the resultant silver nano-structures have proper activity, which is fairy difficult. When the single dropwise addition quantity exceeds 210 μl, it is necessary to further increase the stirring velocity to prevent readiness to precipitate, which is again, technically very difficult.

Furthermore, the dropwise addition rate of $AgNO_3$ may range between 3-155 μl/s, or preferably, between 45-55 μl/s, or most preferably, may be 50 μl/s. When the dropwise addition rate is less than 30 μl/s, small-sized silver nano-structures will form with reduced activity. When the dropwise addition rate exceeds 155 μl/s, the silver nano-structures will agglomerate with each other to the extent of precipitation.

The total dropwise addition quantity of $AgNO_3$ may range between 6/100-23/100 volume ratio, or preferably, between 7/100-11/50 volume ratio, with reference to the volume of the $NaBH_4$ reductant solution prepared at step 2 as 1. When the total dropwise addition quantity is less than 6/100 volume ratio, the remnant of the reductant hinders arrival at the end point, while when the total dropwise addition quantity exceeds 23/100, the silver nano-structures continuously agglomerate to the extent of precipitation.

According to the preparation method of the present invention, step 4 involves ending the reaction by adding a small amount of $NaBH_4$ used at step 1. The volume ratio of $NaBH_4$ to add to end the reaction may range between 1/40-1/20 with reference to the volume of $NaBH_4$ used at step 1 as 1, but not limited thereto.

According to one embodiment, the present invention provides silver nano-structures prepared with the preparation method 1 at 0-5° C.

According to the present invention, the silver nano-structures form in a regular average size of 15-35 nm, and with particles formed in such a shape to enhance SERS signals due to presence of hot spot or interstitial field, which is a very strong electromagnetic field in which two to four particles aggregate with each other.

Further, according to an embodiment, the present invention provides silver nano-structures prepared with the preparation method 2 at room temperature.

The silver nano-structure according to the present invention are formed to regular average size of 30-50 nm, with particles formed in such a shape to enhance SERS signals due to presence of hot spot or interstitial field, which is a very strong electromagnetic field in which two to four particles agglomerate with each other.

As explained above, since the preparation method of silver nano-structures for use as substrate of surface-enhanced Raman scattering (SERS) according to the present invention can ensure that the 'hot spot' is provided, which is the considerably very intense electromagnetic field in which the silver nano-structures have uniform average size and very strong forms of particles, by characterizing a variety of conditions such as, for example, concentration of $AgNO_3$ and reductant, reaction temperature, stirring velocity, single dropwise addition quantity, dropwise addition rate, or total dropwise addition quantity, which were unpredictable in the conventional silver nanoparticle preparation method using $AgNO_3$ aqueous solution and $NaBH_4$ reductant, the preparation method can be advantageously applied for the mass production of silver nano-structures for use as substrate of SERS because the method can provide multimer form with enhanced SERS signals and reproducibility, and also ability to selectively control the particle size. (see Experimental Examples 1 and 2).

Herein below, the present invention will be explained in detail with reference to the Examples below. However, the present invention is not limited to any specific examples provided below, since the examples are provided for the illustrative purpose only.

EXAMPLES 1-1 to 1-29

Preparation of Silver Nanostructures 1

To a flask maintained at 0° C. in ice bath, 30.0 mL of $NaBH_4(2.0\times10^{-3}$ M) cooled to 0° C. was introduced and stirred at 1500 rpm, $AgNO_3(8.0\times10^{-3}$ M) at room temperature was dropwise added under the condition tabulated below (see Table 1) on single dropwise addition quantity, dropwise addition rate, and total dropwise addition quantity. Dropwise addition of $AgNO_3$ continued until the silver nanostructures were formed, and stopped at a point immediately before the reaction solution has precipitation or turns to navy blue which was considered to be the end point. The reaction was then ended upon addition of 1.0 mL of 0° C. $2.0\times10^{-3}$ M $NaBH_4$, leaving silver nanostructures.

EXAMPLES 2-1 to 2-28

Preparation of Silver Nanostructures 2

The silver nanostructures were prepared in the same manner as Examples 1-1 to 1-29, except for difference of using flask exposed to room temperature instead of flask maintained at 0° C., and of dropwise adding $AgNO_3(8.0\times10^{-3}$ M) under the conditions tabulated below (see Table 1) on single dropwise addition quantity, dropwise addition rate, and total dropwise addition quantity.

COMPARATIVE EXAMPLE 1

Preparation of Silver Nanostructures 3

While intensely stirring $NaBH_4(2\times10^{-3}$ M, 30 mL) maintained at 0° C., $AgNO_3(1.0\times10^{-3}$ M, 10 mL) was dropwise added (drop by drop) until end point using 50 mL-sized burette. The reaction solution turns to yellow when reduction occurs, and then turns to navy blue at the end point, at which time the solution again turns to yellow and completes reaction upon dropwise addition of $NaBH_4(2\times10^{-3}$ M, 1 mL) [T. H. Joo, K. Kim, and M. S. Kim, Chem. Phys. Lett. 112, 65 (1984)]. The method of Comparative Example 1 was conducted total 20 times, with total average dropwise addition quantity measured as 25 mL, and dropwise addition time as 236 sec, thus indicating the average dropwise addition rate of 106 μl/s.

TABLE 1

| | $8.0/10^{-3}$M $AgNO_3$ at room temperature | | |
|---|---|---|---|
| Example | Single dropwise addition quantity (μl) | Dropwise addition rate (μl/s) | Total dropwise addition quantity (mL) |
| 1-1 | 50 | 5 | 2.1 |
| 1-2 | 50 | 5.6 | 2.5 |
| 1-3 | 50 | 6.2 | 2.8 |
| 1-4 | 50 | 7.1 | 2.9 |

TABLE 1-continued

| | 8.0/10$^{-3}$M AgNO$_3$ at room temperature | | |
|---|---|---|---|
| Example | Single dropwise addition quantity (μl) | Dropwise addition rate (μl/s) | Total dropwise addition quantity (mL) |
| 1-5 | 50 | 8.3 | 3.2 |
| 1-6 | 50 | 10 | 3.6 |
| 1-7 | 50 | 12.5 | 3.8 |
| 1-8 | 50 | 16.7 | 4.3 |
| 1-9 | 50 | 25 | 4.9 |
| 1-10 | 50 | 50 | 5.9 |
| 1-11 | 100 | 11.1 | 3.8 |
| 1-12 | 100 | 12.5 | 4.0 |
| 1-13 | 100 | 14.3 | 4.4 |
| 1-14 | 100 | 16.7 | 4.6 |
| 1-15 | 100 | 20 | 5.0 |
| 1-16 | 100 | 25 | 5.2 |
| 1-17 | 100 | 33.3 | 5.6 |
| 1-18 | 100 | 50 | 6.1 |
| 1-19 | 100 | 75 | 6.4 |
| 1-20 | 100 | 100 | 6.4 |
| 1-21 | 200 | 10 | 3.3 |
| 1-22 | 200 | 13.3 | 3.8 |
| 1-23 | 200 | 16.7 | 4.4 |
| 1-24 | 200 | 20 | 4.6 |
| 1-25 | 200 | 25 | 5.0 |
| 1-26 | 200 | 33.3 | 5.5 |
| 1-27 | 200 | 40 | 5.7 |
| 1-28 | 200 | 50 | 6.1 |
| 1-29 | 200 | 66.7 | 6.3 |
| 2-1 | 50 | 5.6 | 1.4 |
| 2-2 | 50 | 6.3 | 1.7 |
| 2-3 | 50 | 7.1 | 1.7 |
| 2-4 | 50 | 8.3 | 2.1 |
| 2-5 | 50 | 10 | 2.2 |
| 2-6 | 50 | 12.5 | 2.6 |
| 2-7 | 50 | 16.7 | 3.0 |
| 2-8 | 50 | 25 | 3.9 |
| 2-9 | 50 | 50 | 5.4 |
| 2-10 | 50 | 100 | 6.2 |
| 2-11 | 100 | 11.1 | 2.2 |
| 2-12 | 100 | 12.5 | 2.4 |
| 2-13 | 100 | 14.3 | 2.6 |
| 2-14 | 100 | 16.7 | 2.8 |
| 2-15 | 100 | 20 | 3.2 |
| 2-16 | 100 | 25 | 3.5 |
| 2-17 | 100 | 33.3 | 4.1 |
| 2-18 | 100 | 50 | 4.9 |
| 2-19 | 100 | 75 | 5.9 |
| 2-20 | 100 | 100 | 6.3 |
| 2-21 | 100 | 150 | 6.5 |
| 2-22 | 200 | 25 | 3.6 |
| 2-23 | 200 | 28.6 | 4.0 |
| 2-24 | 200 | 33.3 | 4.2 |
| 2-25 | 200 | 40 | 4.7 |
| 2-26 | 200 | 50 | 5.1 |
| 2-27 | 200 | 66.7 | 5.8 |
| 2-28 | 200 | 100 | 6.4 |
| Comparative Example 1 | Drop by drop | 106 | 25 |

EXPERIMENTAL EXAMPLE 1

Characterization of Silver Nanostructure

The shapes and sizes of silver nanostructures according to the Examples of the present invention were investigated with TEN (Model name: JEM-2011, Manufacturer: JEOL) and SEM (Model name: S-4800, Manufacturer: Hitachi), as shown in FIGS. 1 to 6.

Figure 1:
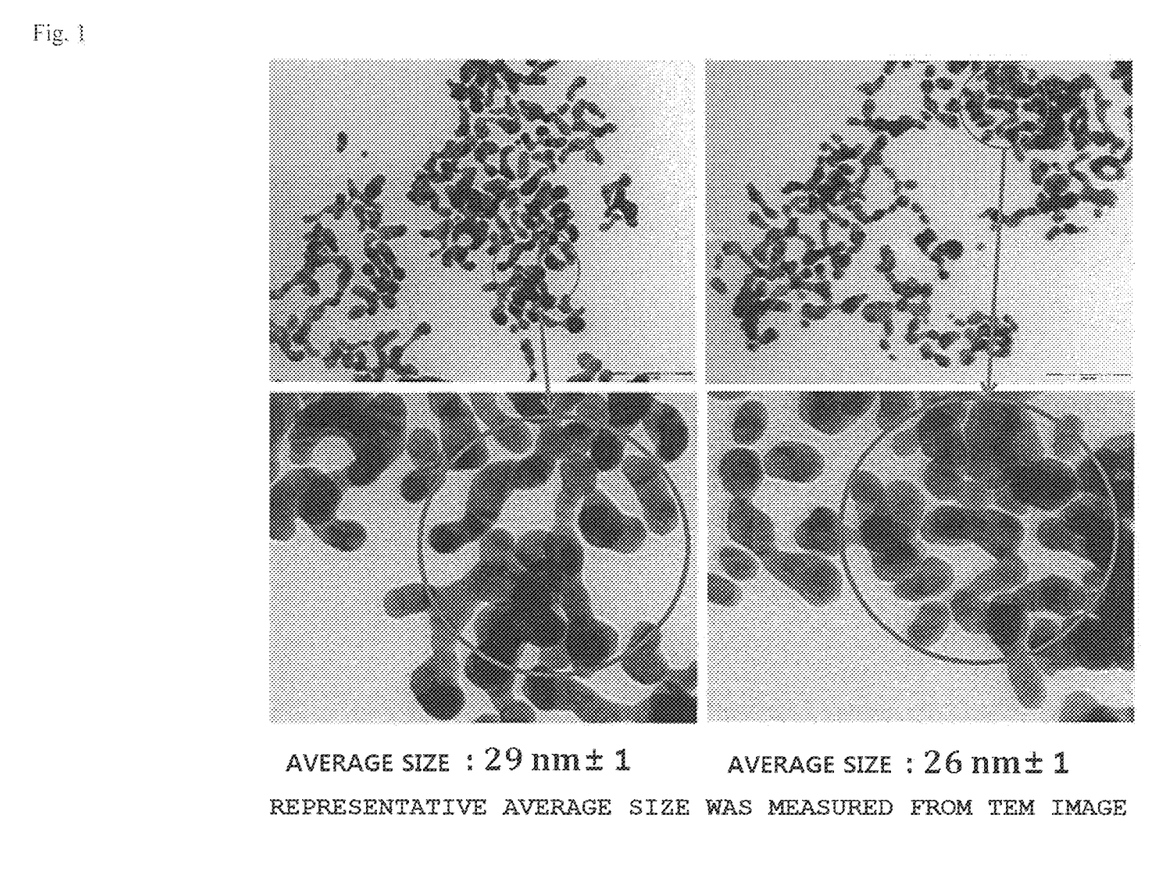
FIG. 1 presents TEM images of the silver nanostructure prepared at Example 1-10 (The left-hand side image represents condition before SERS activity measurement, and right-hand side image represents condition after SERS activity measurement)

FIG. 1 presents TEM images of the silver nanostructure prepared at Example 1-10 (The left-hand side image represents condition before SERS activity measurement, and right-hand side image represents condition after SERS activity measurement).

Figure 2:
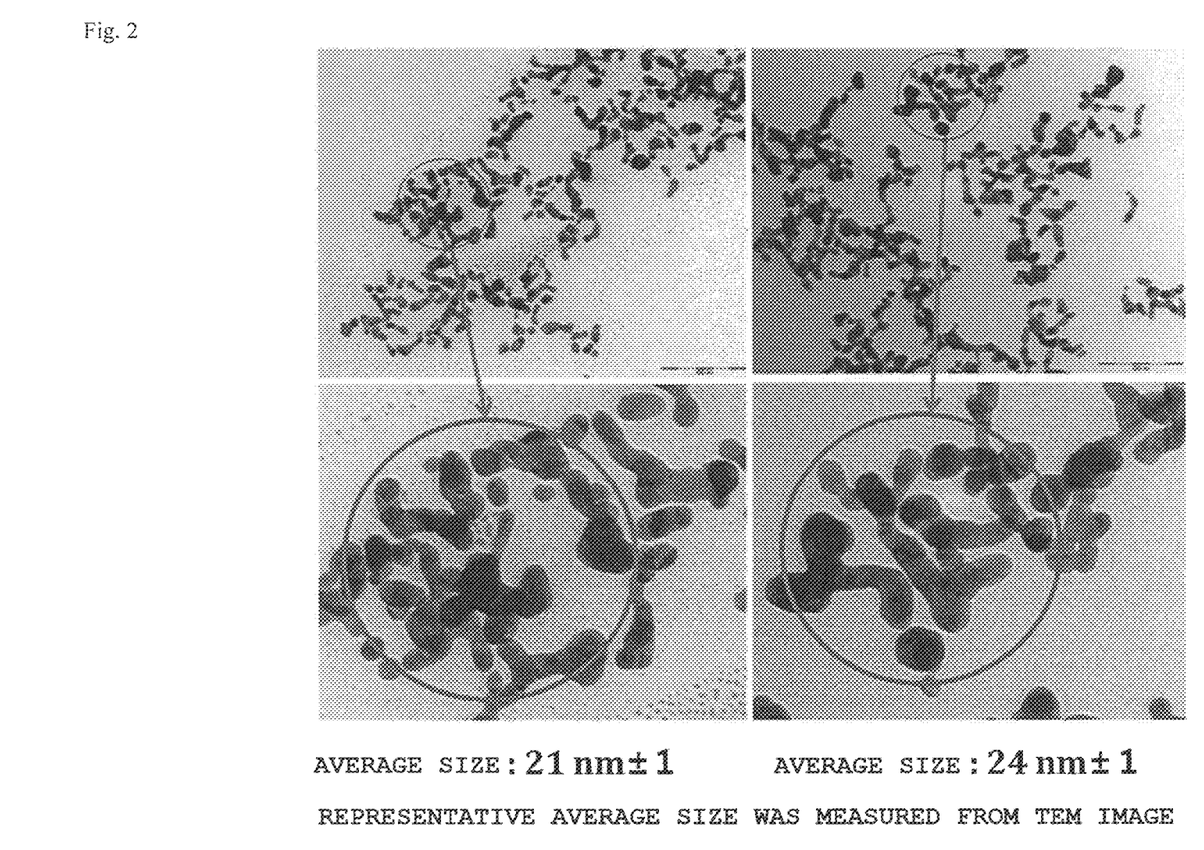
FIG. 2 presents TEM images of the silver nanostructure prepared at Example 1-8 (The left-hand side image represents condition before SERS activity measurement, and right-hand side image represents condition after SERS activity measurement)

FIG. 2 presents TEM images of the silver nanostructure prepared at Example 1-8 (The left-hand side image represents condition before SERS activity measurement, and right-hand side image represents condition after SERS activity measurement).

Figure 3:
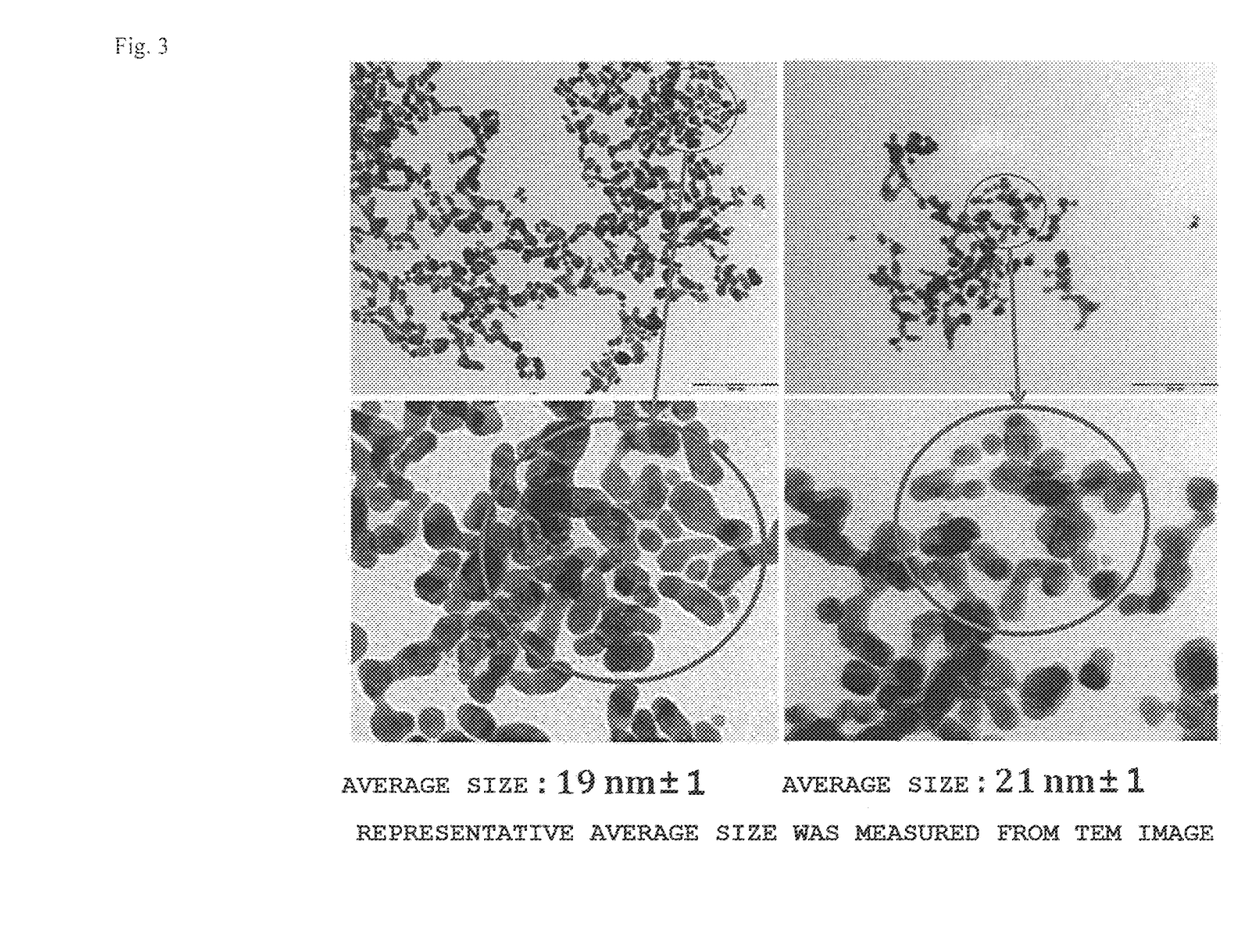
FIG. 3 presents TEM images of the silver nanostructure prepared at Example 1-2 (The left-hand aide image represents condition before SERS activity measurement, and right-hand side image represents condition after SERS activity measurement)

FIG. 3 presents TEM images of the silver nanostructure prepared at Example 1-2 (The left-hand side image represents condition before SERS activity measurement, and right-hand side image represents condition after SERS activity measurement).

Figure 4:
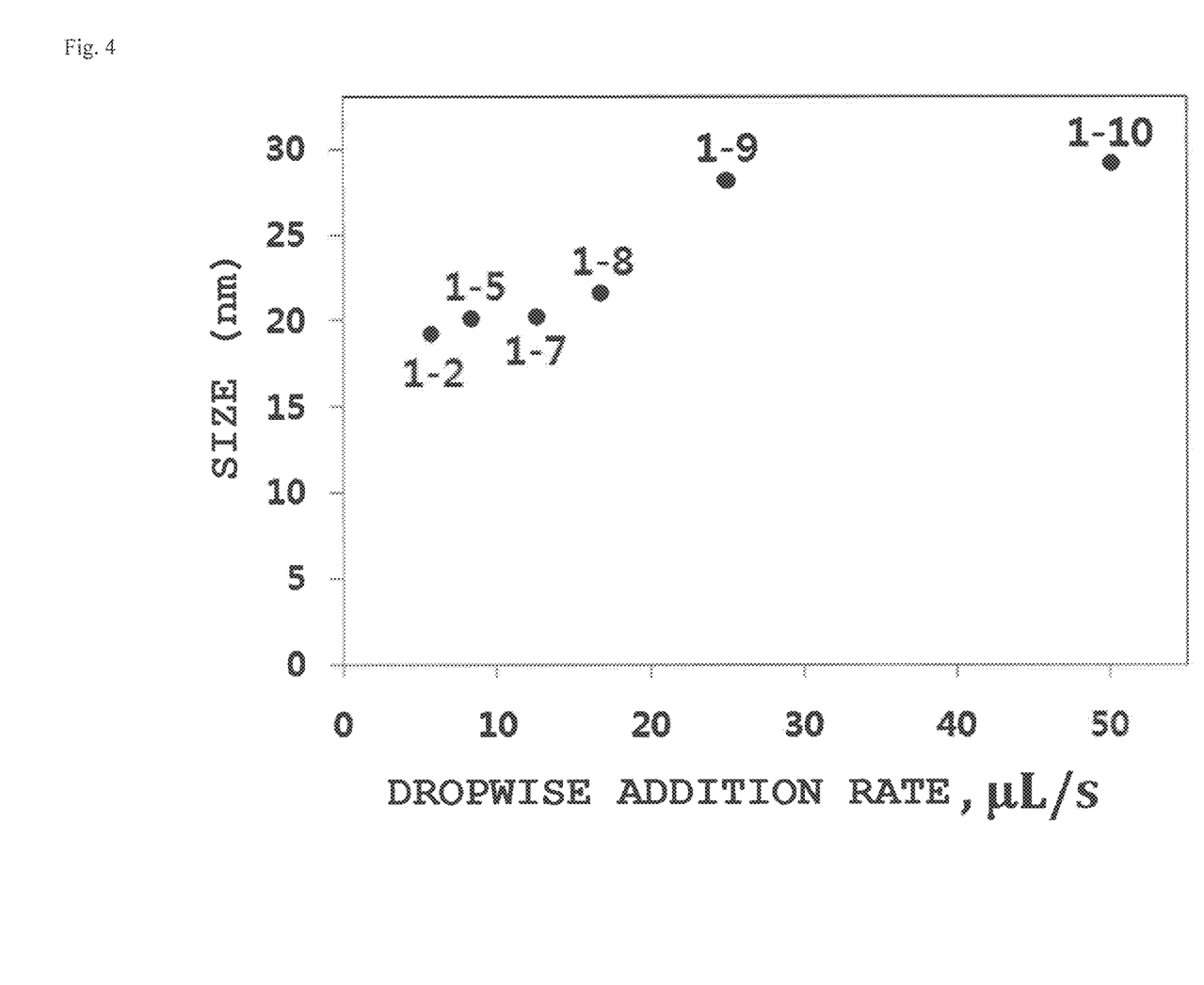
FIG. 4 is a graph representing transversal average size of silver nanostructure according to an embodiment of the present invention.

FIG. 4 is a graph representing transversal average size of silver nanostructure according to an embodiment of the present invention.

Figure 5:
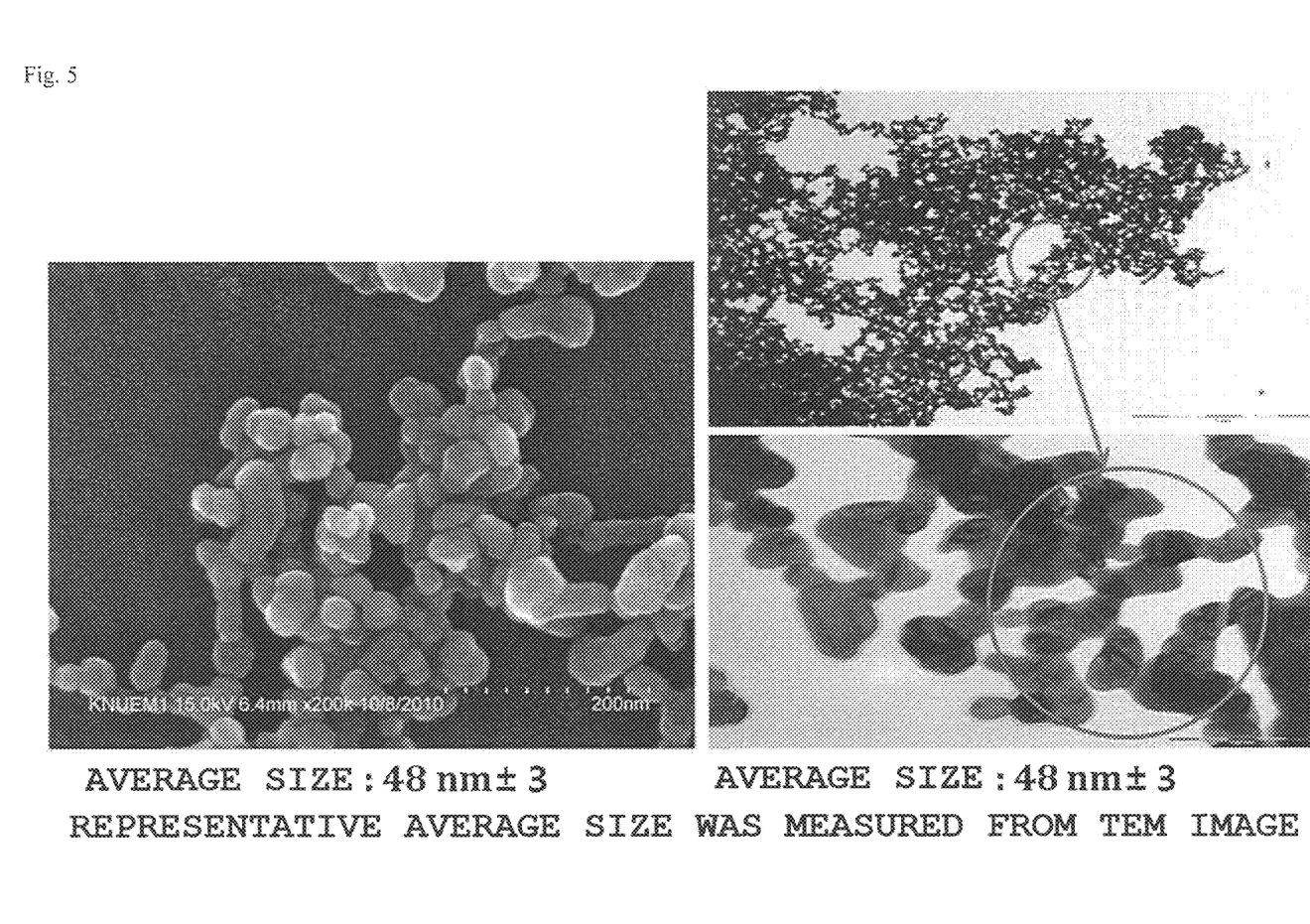
FIG. 5 presents SEM and TEN images of silver nanostructure prepared at Example 2-9 ((a) SEM image, (b) TEM image)

FIG. 5 presents SEM and TEM images of silver nanostructure prepared at Example 2-9 ((a) SEM image, (b) TEM image).

Figure 6:
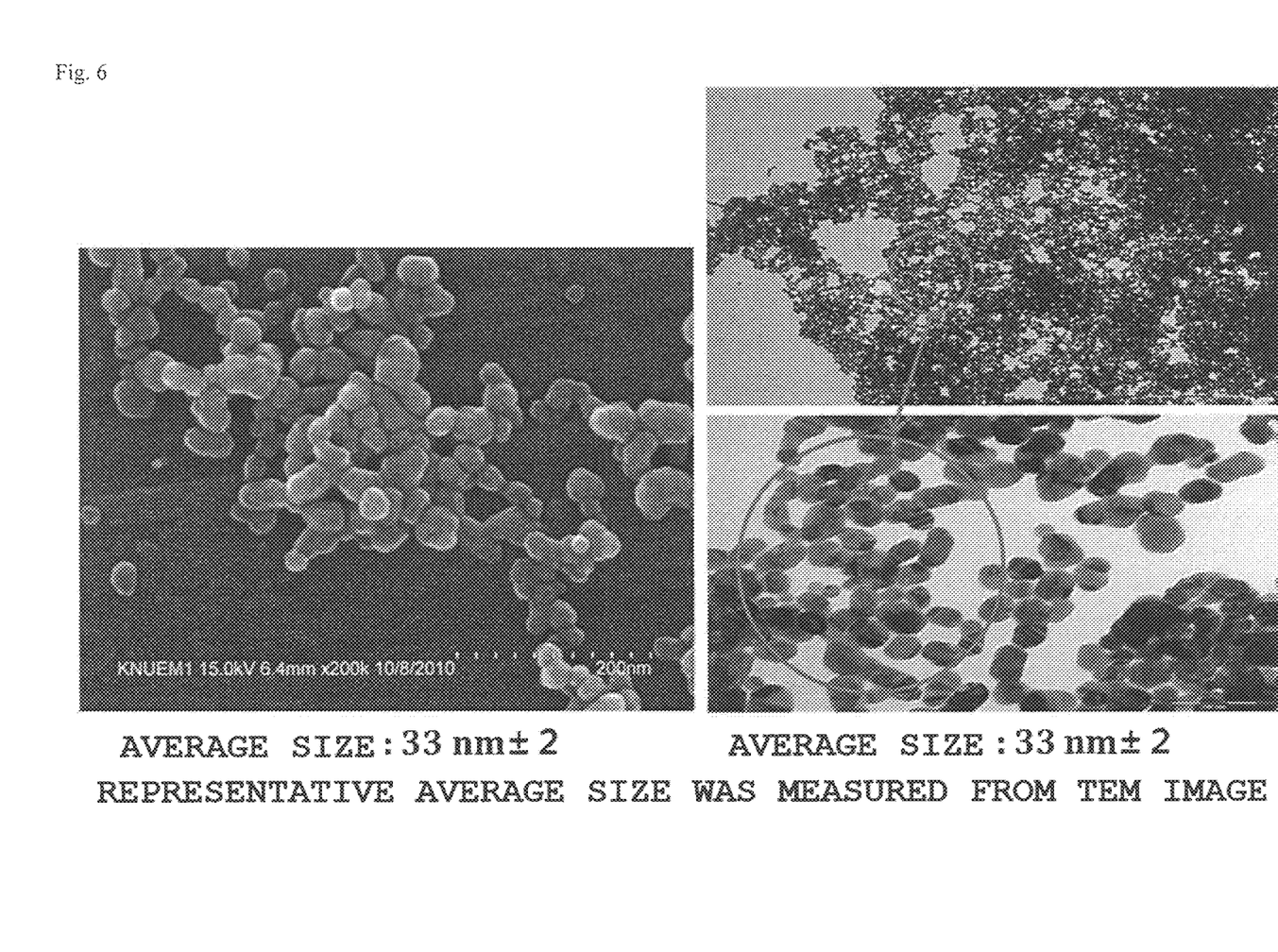
FIG. 6 presents SEM and TEM images of silver nanostructure prepared at Example 2-7 ((a) SEM image, (b) TEM image)

FIG. 6 presents SEM and TEM images of silver nanostructure prepared at Example 2-7 ((a) SEM image, (b) TEM image).

Referring to FIGS. 1-6 showing Examples 1-1 to 1-29, the silver nanostructure prepared at temperature maintained at 0° C. had formation of hot spot or interstitial field which is very intense electromagnetic field where two to four particles agglomerate to multimer structure with enhanced SERS signal, and had average size of 15-35 nm. The silver nanostructure prepared at room temperature according to Examples 2-1 to 2-28 also showed agglomeration of two to four particles, and average size of 30-50 nm. Further, referring to FIG. 4, the silver nanostructure was increased in size as the dropwise addition rate increased. The above finding revealed that the silver nanostructures prepared according to the Examples had narrow distribution with regular average sizes, in which the particles were prepared as reproducible multimer form in which two to four particles agglomerate and that it is possible to prepare the silver nanostructures by selectively regulating the size thereof to be suitable for use as the substrate of surface-enhanced Raman scattering (SERS).

Accordingly, the silver nanostructures prepared according to the preparation method of the present invention can be prepared so that the particles are formed into multimer shape with enhanced SERS signal which is reproducible, and can also be advantageously regulated to size suitable for use as substrate of SERS.

EXPERIMENTAL EXAMPLE 2

Evaluation of Silver Nanostructure Activity as the Substrate of Surfaced-enhanced Raman Scattering (SERS)

The activity of the silver nanostructure for the substrate of SERS according to the embodiments of the present invention has been investigated with the following experiment.

By mixing 1 mL of the silver nanostructure prepared at Examples and Comparative Example 1 with Raman activating molecules, i.e., with 20 μl of benzoic acid ($2\times10^{-2}$ M) and stabilizer (20 μl of PVP($2\times10^{-4}$ M)), the benzoic acid was adsorbed onto the silver nanostructures. With the Raman spectroscopy (Model name: SP2500, Manufacturer: Princeton Instruments), Raman spectra were acquired to thus measure the peak intensity near 1000 cm$^{-1}$ of benzoic acid and so the SERS activity was evaluated. The SERS activity of the silver nanostructure prepared at Examples were compared with reference to the silver nanostructures prepared at Comparative Example 1. Average value was obtained from 15 repetitions to increase credibility, as is presented in FIGS. 7 to 9.

Figure 7:
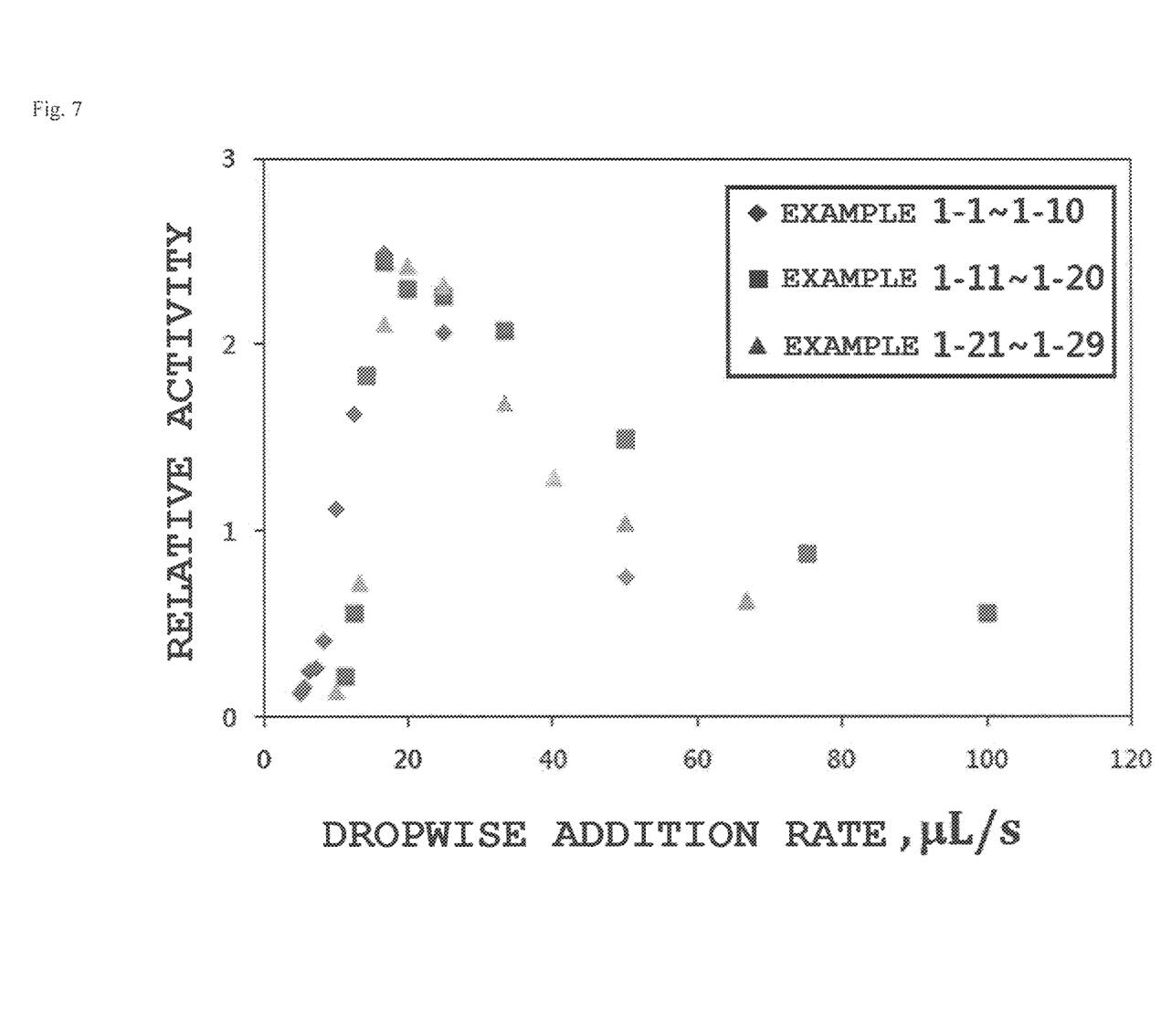
FIG. 7 is a graph representing comparison of SERS activity between silver nanostructure of Examples 1-1 to 1-29 and silver nanostructure of Comparative Example 1.

FIG. 7 is a graph representing comparison of SERS activity between silver nanostructure of Examples 1-1 to 1-29 and silver nanostructure of Comparative Example 1.

Figure 8:
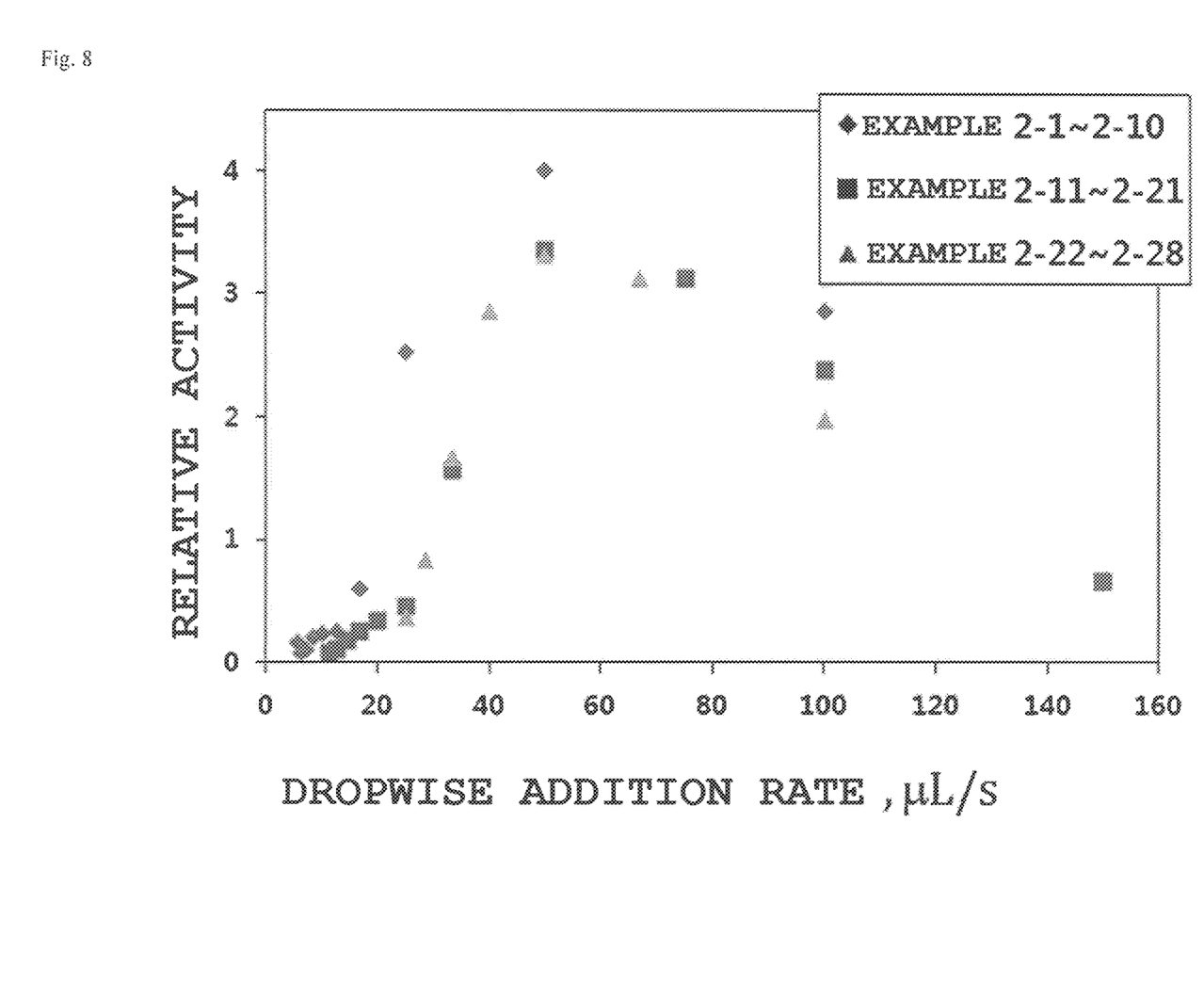
FIG. 8 is a graph representing comparison of SERS activity between silver nanostructure of Examples 2-1 to 2-28 and silver nanostructure of Comparative Example 1.

FIG. 8 is a graph representing comparison of SERS activity between silver nanostructure of Examples 2-1 to 2-28 and silver nanostructure of Comparative Example 1.

Figure 9:
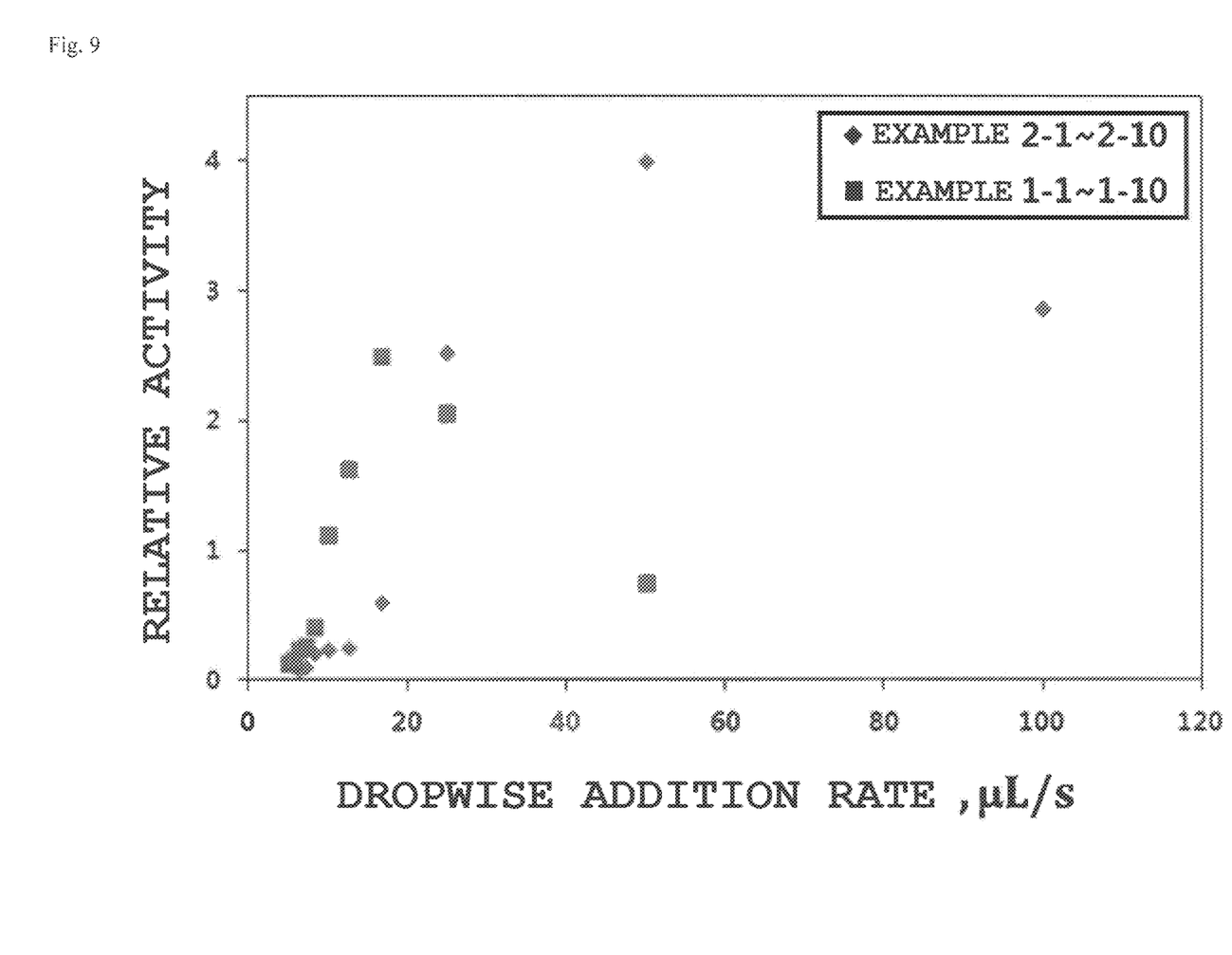
FIG. 9 is a graph representing comparison of SERS activity between silver nanostructures of Examples 1-1 to 1-10 (fixed temperature: 0° C., single dropwise addition quantity: 50 μl), of Examples 2-1 to 2-10 (room temperature, single dropwise addition quantity: 50 μl) and of Comparative Example 1.

FIG. 9 is a graph representing comparison of SERS activity between silver nanostructures of Examples 1-1 to 1-1 (fixed temperature: 0° C., single dropwise addition quantity: 50 μl), of Examples 2-1 to 2-10 (room temperature, single dropwise addition quantity: 50 μl) and of Comparative Example 1.

Referring to FIGS. 7 to 9, among the silver nanostructures prepared according to Examples 1-1 to 1-29 (which were allowed to react at temperature fixed at 0° C.), the silver nanostructure prepared with dropwise addition rate at Example 1-8 (16.7 μl/s) exhibited approximately 2.5 times greater SERS activity than Comparative Example 1. Further, among the silver nanostructures prepared according to Examples 2-1 to 2-28 (allowed to react at room temperature), the silver nanostructure prepared according to Example 2-9 (dropwise addition rate: 50 μl/s) exhibited approximately 4 times greater SERS activity than Comparative Example 1.

Accordingly, since the silver nanostructure prepared according to the preparation method of the present invention provides greatly enhanced SERS activity than the silver nanostructures prepared according to conventional preparation methods, the preparation method can be advantageously used for the preparation of silver nanostructures for use as substrate of SERS.

The foregoing exemplary embodiments and advantages are merely exemplary and are not to be construed as limiting the present invention. The present teaching can be readily applied to other types of apparatuses. Also, the description of the exemplary embodiment of the present inventive concept is intended to be illustrative, and not to limit the score of the claims.

What is claimed is:

1. A method for preparing silver nano-structures for use as substrate of surface-enhanced Raman scattering (SERS), comprising steps of:
cooling $NaBH_4$ down to 0-5° C. (step 1);
preparing reductant solution by placing $NaBH_4$ cooled at step 1 in a flask maintained at 0-5° C. or room temperature, and stirring the same (step 2);
obtaining reaction solution by dropwise-adding room-temperature $AgNO_3$ to the reductant solution prepared at step 2 until an end point (step 3); and
ending the reaction by adding $NaBH_4$ prepared at step 1 into the reaction solution obtained at step 3.

2. The method as set forth in claim 1, comprising steps of:
cooling $NaBH_4$ at concentration between $1.0 \times 10^{-3}$ M and $3.0 \times 10^{-3}$ M down to 0-5° C. (step 1);
preparing reductant solution by placing $NaBH_4$ cooled to 0-5° C. at step 1 in a flask maintained at 0-5° C., and stirring the same at 1000-2000 rpm (step 2);
obtaining reaction solution by dropwise adding room-temperature $AgNO_3$ at concentration between $7.0 \times 10^{-3}$ M and $9.0 \times 10^{-3}$ M to the reductant solution of step 2 until an end point, according to conditions comprising 40-210 μl of single dropwise addition, 3-105 μl/s of dropwise rate, and 6/100 -23/100 volume ratio for total dropwise addition quantity (step 3); and
ending the reaction by adding $NaBH_4$ prepared at step 1 to the reaction solution obtained at step 3, at a volume ratio of 1/40 -1/20 (step 4),
wherein the volume ratios of steps 3 and 4 are determined with reference to the volume of the reductant solution prepared at step 2.

3. The method as set forth in claim 2, wherein $NaBH_4$ at step 1 is cooled to 0-2° C.

4. The method as set forth in claim 2, wherein the stirring at step 2 is performed at a velocity of 1400-1600 rpm.

5. The method as set forth in claim 2, wherein the concentration of $AgNO_3$ ranges between $7.5 \times 10^{-3}$ M and $8.5 \times 10^{-3}$ M.

6. The method as set forth in claim 2, wherein, at step 3, the single dropwise addition quantity is 45-55 μl, and the dropwise addition rate is 15-20 μl/s.

7. The method as set forth in claim 1, comprising steps of:
cooling $NaBH_4$ at concentration between $1.0 \times 10^{-3}$ M and $3.0 \times 10^{-3}$ M down to 0-5° C. (step 1);
preparing reductant solution by introducing $NaBH_4$ cooled to 0-5° C. at step 1 into a flask maintained at room temperature and stirring the same at a velocity of 1000-2000 rpm (step 2);
obtaining reaction solution by dropwise adding room-temperature $AgNO_3$ at concentration between $7.0 \times 10^{-3}$ M and $9.0 \times 10^{-3}$ M according to conditions comprising 40-210 μl of single dropwise addition quantity, 3-155 μl of dropwise addition rate and 6/100-23/100 volume ratio of total dropwise addition quantity, to the reductant solution of step 2 (step 3); and
ending the reaction by adding $NaBH_4$ prepared at step 1 by a volume ratio of 1/40 -1/20, to the reaction solution obtained at step 3 (step 4),
wherein the volume ratios at steps 3 and 4 are determined with reference to the volume of the reductant solution prepared at step 2.

8. The method as set forth in claim 7, wherein, at step 3, the single dropwise addition quantity is 45-55 μl, and the dropwise addition rate is 45-55 μl/s.

9. The method as set forth in claim 1, wherein $NaBH_4$ at step 1 is at a concentration between $1.5 \times 10^{-3}$ M and $2.5 \times 10^{-3}$ M.

* * * * *